(12) United States Patent
Seeley

(10) Patent No.: US 9,144,328 B2
(45) Date of Patent: Sep. 29, 2015

(54) INTERACTIVE TRANSPARENT TOUCH SCREEN DOORS FOR WINE CABINETS

(71) Applicant: Whirlpool Corporation, Benton Harbor, MI (US)

(72) Inventor: Michael S. Seeley, South Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 308 days.

(21) Appl. No.: 13/668,548

(22) Filed: Nov. 5, 2012

(65) Prior Publication Data

US 2014/0125599 A1    May 8, 2014

(51) Int. Cl.
   *G06K 9/00*    (2006.01)
   *A47F 3/04*    (2006.01)
   *G06F 3/0488*    (2013.01)
   *A47B 73/00*    (2006.01)

(52) U.S. Cl.
   CPC ............ *A47F 3/043* (2013.01); *G06F 3/04886* (2013.01); *A47B 73/00* (2013.01)

(58) Field of Classification Search
   None
   See application file for complete search history.

(56) References Cited

U.S. PATENT DOCUMENTS

| | | | |
|---|---|---|---|
| 2007/0143190 A1 | 6/2007 | Banerjee | |
| 2007/0162335 A1 | 7/2007 | Banerjee | |
| 2007/0162357 A1* | 7/2007 | Banerjee et al. | 705/28 |
| 2007/0191983 A1* | 8/2007 | Griffits et al. | 700/213 |
| 2007/0233567 A1* | 10/2007 | Daly | 705/14 |
| 2008/0122798 A1* | 5/2008 | Koshiyama et al. | 345/173 |
| 2009/0178427 A1* | 7/2009 | Eichman | 62/331 |
| 2010/0138037 A1* | 6/2010 | Adelberg et al. | 700/241 |
| 2010/0235406 A1* | 9/2010 | Williams et al. | 707/803 |
| 2010/0307065 A1* | 12/2010 | Eckartsberg | 49/475.1 |
| 2011/0166694 A1* | 7/2011 | Griffits et al. | 700/215 |
| 2011/0214440 A1* | 9/2011 | Kueny et al. | 62/125 |
| 2012/0029691 A1* | 2/2012 | Mockus et al. | 700/232 |
| 2012/0080517 A1* | 4/2012 | Braunstein | 235/379 |
| 2012/0105424 A1* | 5/2012 | Lee et al. | 345/212 |
| 2012/0285089 A1* | 11/2012 | Artwohl et al. | 49/70 |
| 2014/0078407 A1* | 3/2014 | Green et al. | 348/836 |
| 2014/0100691 A1* | 4/2014 | West | 700/232 |

(Continued)

FOREIGN PATENT DOCUMENTS

| | | |
|---|---|---|
| CN | 102479287 A | 5/2012 |
| KR | 20060098648 | 10/2006 |

(Continued)

OTHER PUBLICATIONS

Bonanni, Leonardo, Chia-Hsun Lee, and Ted Selker. "Attention-based design of augmented reality interfaces." CHI'05 extended abstracts on Human factors in computing systems. ACM, 2005.*

*Primary Examiner* — Bhavesh Mehta
*Assistant Examiner* — Sean Conners

(57) ABSTRACT

Interactive transparent touch screen doors for wine cabinets are disclosed. An interactive touch screen door for use with a wine cabinet having a refrigerated compartment and a rack in the refrigerated compartment to hold bottles of wine provides access to the refrigerated compartment and includes a transparent touch display embedded in the door having a size at least corresponding to a portion of the refrigerated compartment intended to store wine, and a controller operatively connected to the transparent touch display configured to provide information associated with wine stored in the cabinet on the transparent touch display.

23 Claims, 20 Drawing Sheets

(56) References Cited

U.S. PATENT DOCUMENTS

2014/0144935 A1\* 5/2014 O'Keefe et al. ............... 222/23
2014/0156459 A1\* 6/2014 Zises ...................... 705/26.61

FOREIGN PATENT DOCUMENTS

| KR | 20060101265 | 10/2006 |
| KR | 20080032567 A | 4/2008 |

\* cited by examiner

INTERACTIVE TRANSPARENT TOUCH SCREEN DOORS FOR WINE CABINETS

FIELD OF THE DISCLOSURE

This disclosure relates generally to wine cabinets, and, more particularly, to interactive transparent touch screen doors for wine cabinets.

BACKGROUND

Wine cabinets, which are also known as wine coolers, wine refrigerators, or refrigerated wine cellars, are purpose-built appliances designed to keep multiple bottles of wine at a substantially optimum temperature and humidity. Wine cabinets include racks that hold bottles of wine at fixed locations.

SUMMARY

An interactive touch screen door for use with a wine cabinet having a refrigerated compartment and a rack in the refrigerated compartment to hold bottles of wine provides access to the refrigerated compartment and includes a transparent touch display embedded in the door having a size at least corresponding to a portion of the refrigerated compartment intended to store wine, and a controller operatively connected to the transparent touch display configured to provide information associated with wine stored in the cabinet on the transparent touch display.

A method of controlling an interactive wine cabinet including a refrigerated compartment, a rack to hold bottles of wine in the refrigerated compartment, a door to provide access to the refrigerated compartment, and a transparent touch display embedded in the door having a size at least corresponding to a portion of the refrigerated compartment intended to store wine includes receiving a wine search parameter via the transparent touch display, and displaying one or more indicators on the transparent touch display corresponding to physical locations of one or more bottles of wine in the cabinet meeting the wine search parameter.

DETAILED DESCRIPTION

Figure 1:
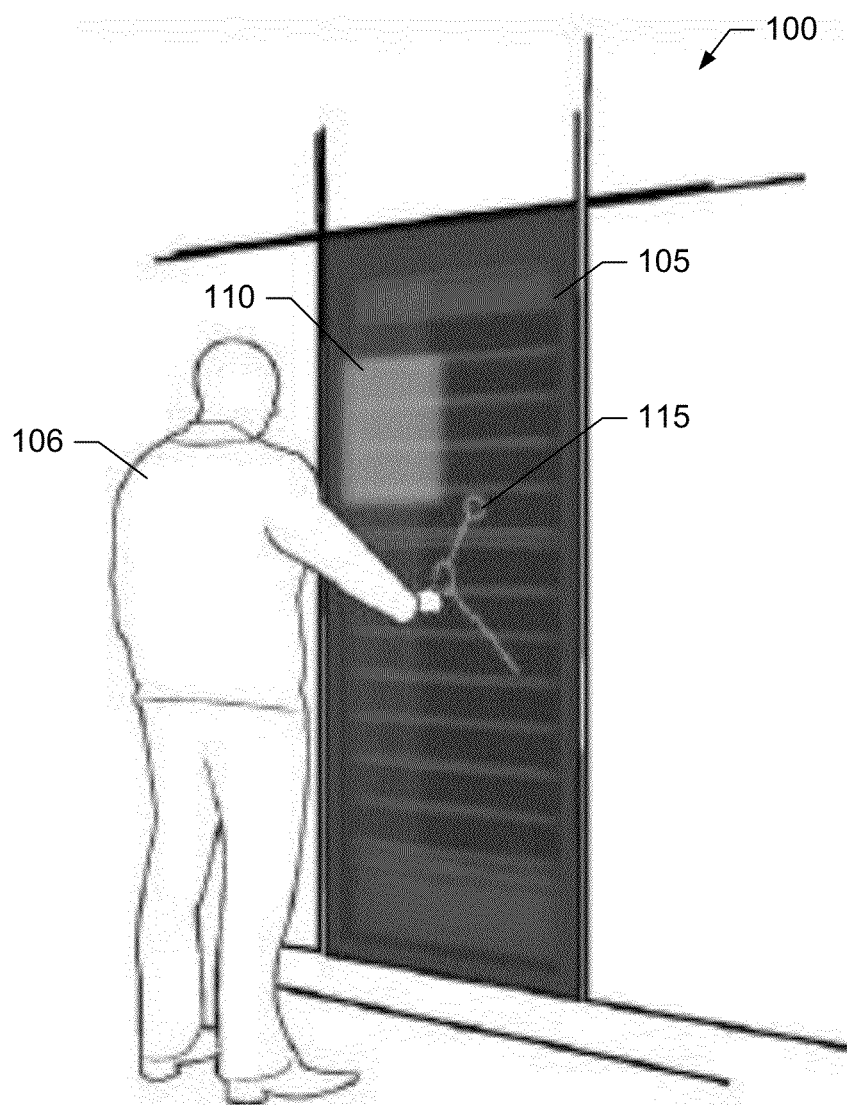
FIG. 1 is a pictorial representation of a wine cabinet having an interactive transparent touch screen door.

FIG. 1 illustrates an example wine cabinet 100 featuring an interactive transparent touch screen door 105. As shown in FIG. 1, a user 106 can interact with the wine cabinet 100 by touching the door 105 and/or viewing information 110 displayed on the door 105. The information 110 may include one or more menus, information about a particular bottle of wine (e.g., location of origin, vineyard, type, food pairing, price, image(s) of label, peak, etc.), and/or indicators (e.g., a circle 115) having locations that physically correspond to the locations of bottles of wine. For example, the user 106 may interact with one or more menus presented on the door 105 to provide one or more wine selection criteria. Wines matching the one or more wine selection criteria can be identified on the door 105 by displaying a circle 115, or some other indicator, at the physical location(s) of the matching wine(s). The door 105 is transparent to enable the user 106 to view the contents of the wine cabinet 100 even while the door 105 is being used. The interactive nature of the door 105 enables the user to virtual interact with the bottles of wine stored in the wine cabinet without having to physical disturb or remove a bottle of wine from the wine cabinet 100. The wine cabinet 105 shares many features of a conventional wine cabinet, which will not be described in detail herein except as necessary for a complete understanding. Moreover, while the wine cabinet 100 depicted in FIG. 1 is a built-in wine cabinet, it will be appreciated that the interactive transparent touch screen doors disclosed herein are applicable to wine cabinets having other form factors.

Figure 2:
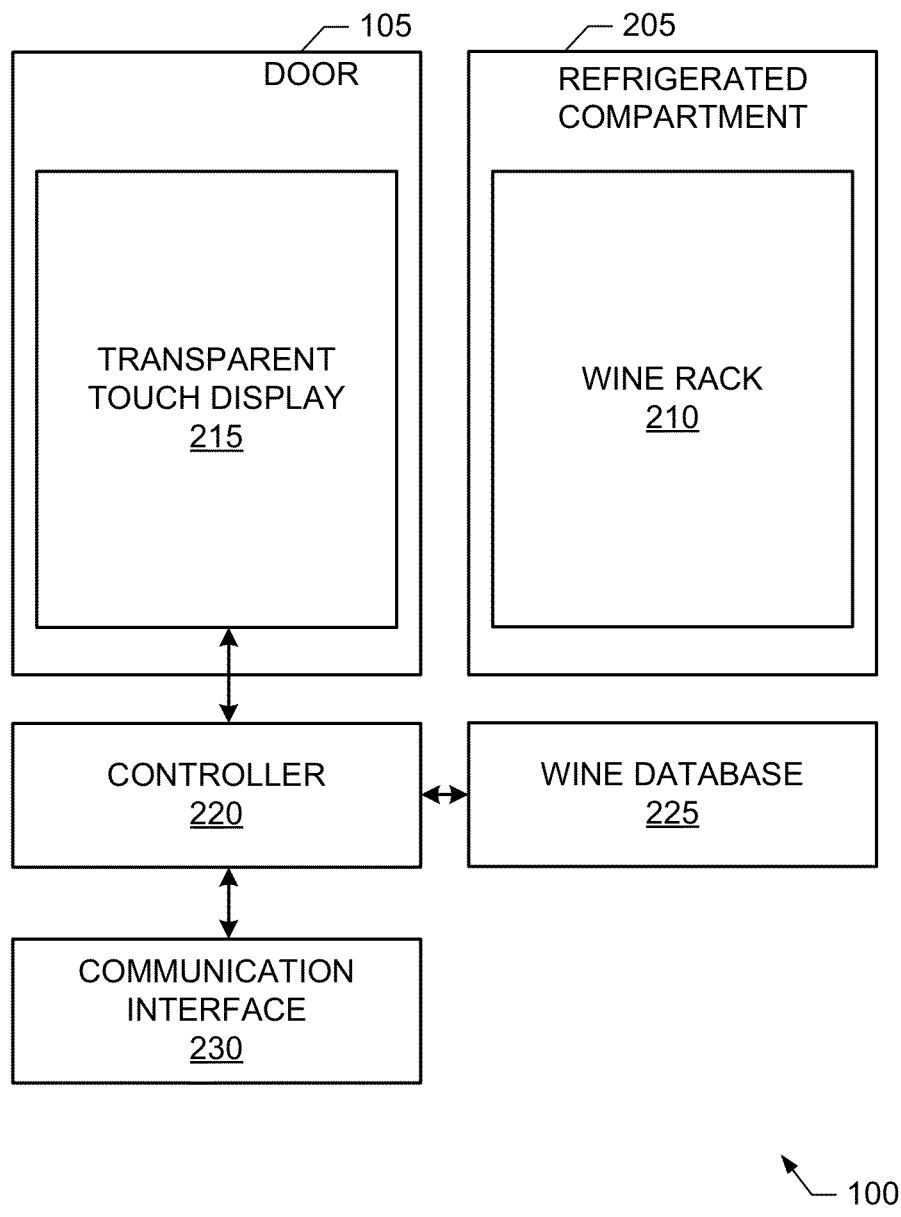
FIG. 2 is a schematic diagram of an example manner of implementing the example wine cabinet of FIG. 1.

As shown in FIG. 2, the wine cabinet 100 includes a refrigerated compartment 205 for refrigerating bottles of wine. The refrigerated compartment 205 has an open face to provide access to the refrigerated compartment 205. The interactive transparent touch screen door 105 is moveably mounted to the wine cabinet 100 for movement between opened and closed positions to selectively open and close the open face of the refrigerated compartment 205. To hold bottles of wine, the refrigerated compartment 205 includes a wine rack 210.

To enable a user to view information and interact with the interactive transparent touch screen door 105, the interactive transparent touch screen door 105 includes an embedded transparent touch display 215 such as a transparent touch organic light-emitting diode (OLED) display. That is, the touch display 215 is an integral part of the touch screen door 105. Because, the touch display 215 is transparent, contents of the wine cabinet 105 can be viewed even while information is displayed on the door 105 by the touch display 215. Preferably, the touch display 215 is sized to at least correspond to an extent of the refrigerated compartment 205 corresponding to the wine rack 210. Thus, the touch display 215 is able to display location information for any bottle of wine stored in the wine cabinet 105. Of course, the touch display 215 may be sized to be larger or smaller than the wine rack 210.

To control the touch display 215, the wine cabinet 100 includes a controller 220. The controller 220 may be implemented by one or more Intel®, AMD®, and/or ARM® microprocessors. Of course, other processors from other processor families and/or manufacturers are also appropriate. The controller 220 executes coded instructions present in a main memory of the controller 220.

To store information representing wine stored in the wine cabinet 100, the wine cabinet 100 may include a wine database 225. Information may be stored in the wine database 225 using any number and/or type(s) of table(s) and/or data structure(s). As discussed below in connection with FIGS. 8, 9 and 10, the wine database 225 may alternatively be stored in a handheld computing device 800 communicatively coupled to the wine cabinet 100. Example information that may be stored in the wine database 225 includes, but is not limited to, location of origin, vineyard, type, food pairing, price, image (s) of label, and peak.

To communicatively couple the wine cabinet 100 to other devices, the wine cabinet 100 may include any number and/or type(s) of communication interface(s) 230 such as a Bluetooth interface, a wireless local area network (WLAN) interface, etc. A handheld computing device (e.g., the handheld computing device 800) communicatively coupled to the wine cabinet 100 via the communication interface 230 can direct the controller 220 to present information associated with wine stored in the wine cabinet 100 and/or wine location information on the touch display 215.

While an example wine cabinet 100 is illustrated in FIG. 2, any of the illustrated devices may be combined, divided, re-arranged, omitted, eliminated and/or implemented in any other way. Moreover, the wine cabinet 100 may include devices instead of, or in addition to, those illustrated in FIG. 2, and/or may include more than one of any or all of the illustrated interfaces, elements and/or devices.

Figure 3:
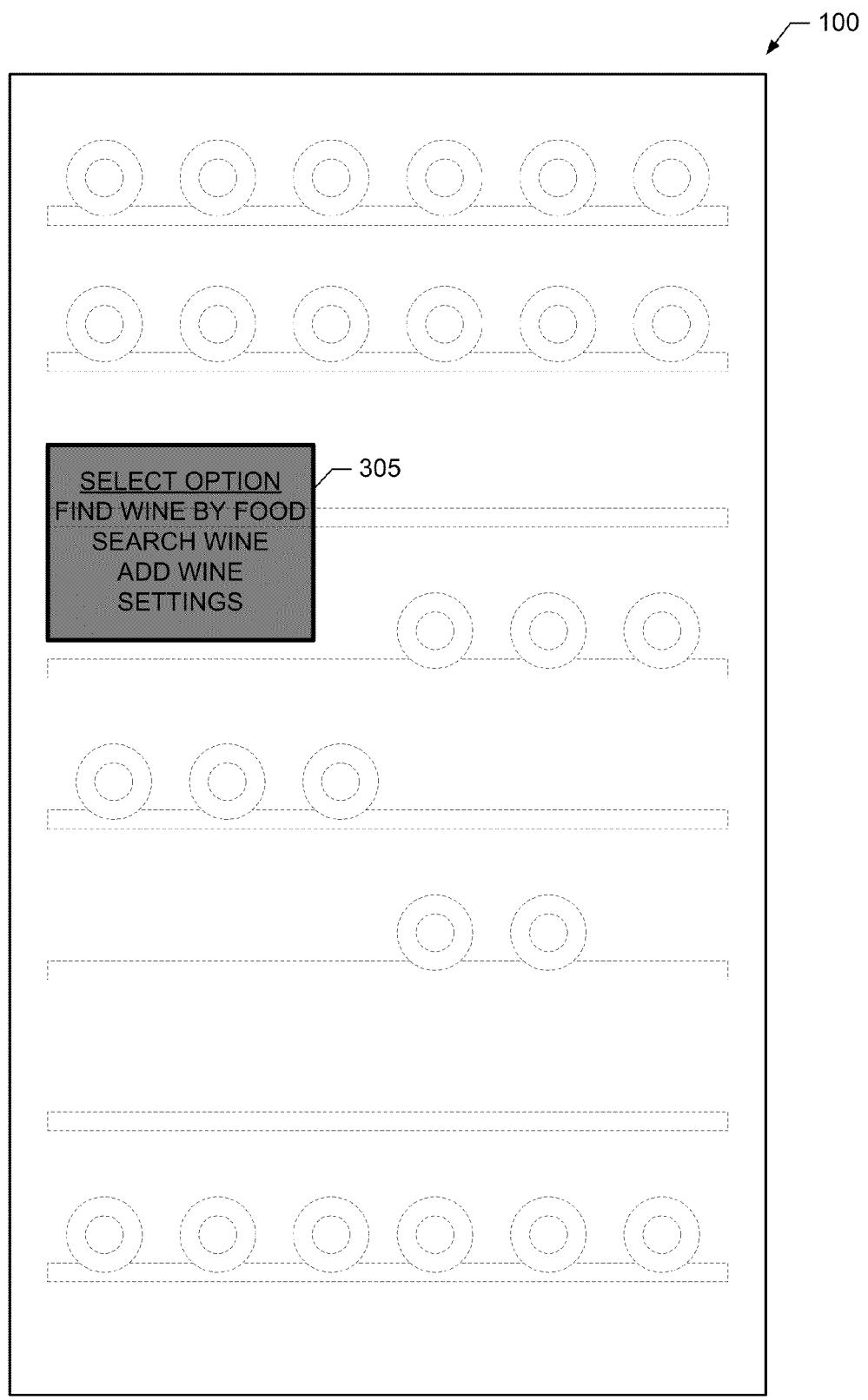
FIG. 3 is a pictorial representation of an example menu displayed by the example interactive transparent touch screen door of FIGS. 1 and 2.

FIG. 3 is a pictorial representation of an example menu 305 displayed by the example touch display 215 after the user 106 has touched the door 105 to activate the touch display 215. Because the door 105 and touch display 215 are transparent, contents of the refrigerated compartment 205 (depicted with dashed lines) remain viewable through the door 105 and the menu 305. The user 106 can select any of the displayed options by touching on or near a corresponding location on the touch screen 215. For example, to find a wine based on a food to be served, the user 106 touches on or near the portion of the touch display 215 corresponding to the phrase "Find Wine By Food."

FIGS. 4A-4E are a pictorial representation of an example usage of the example interactive transparent touch screen door 105 to search for and obtain information associated with a bottle of wine. The example usage of FIGS. 4A-4E may be activated when, for example, the user 106 touches on or near the portion of the example menu 305 of FIG. 3 corresponding to the phrase "Find Wine By Food."

Figure 4A:
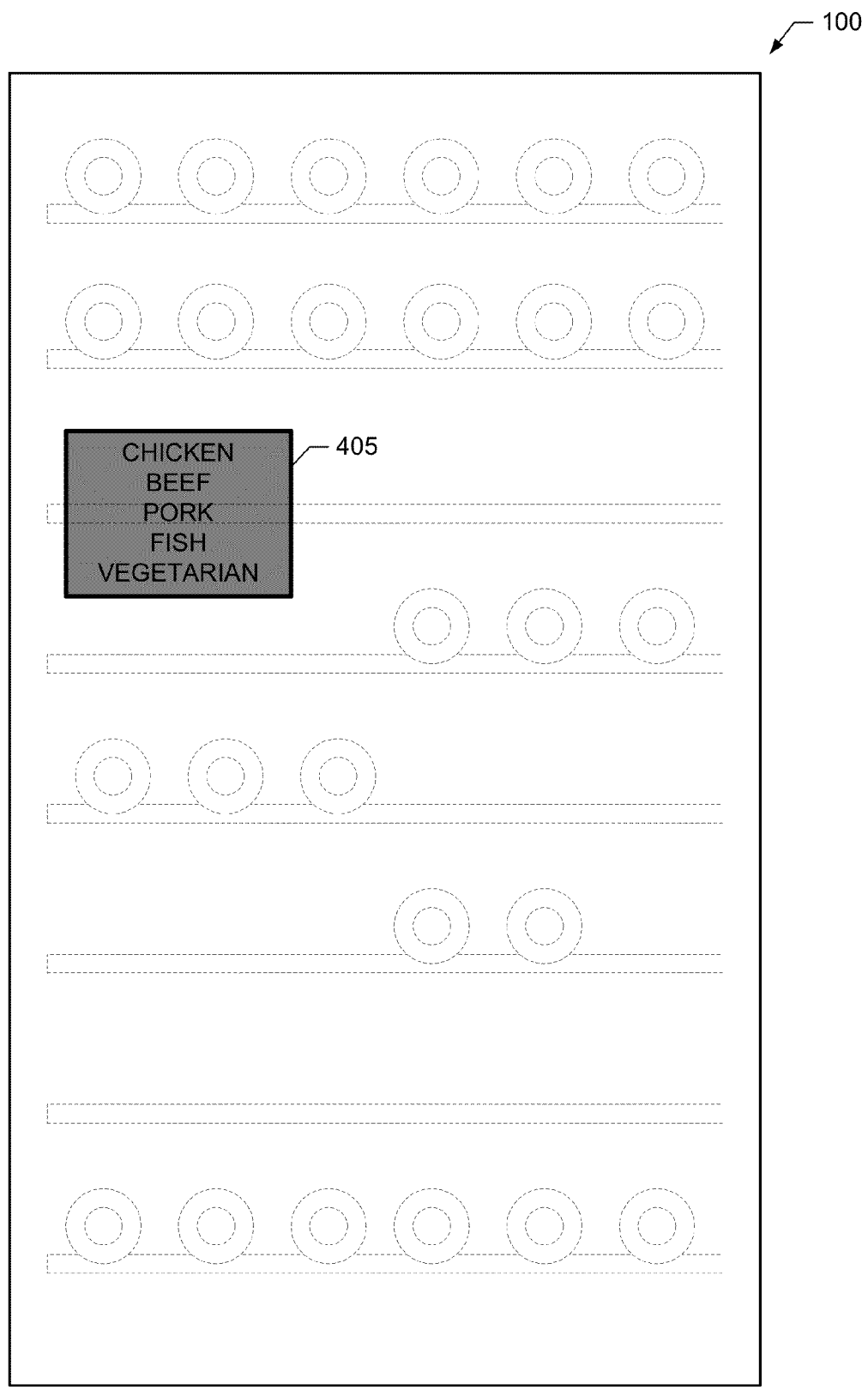
FIGS. 4A-4E are pictorial representations of an example usage of the example interactive transparent touch screen door of FIGS. 1 and 2 to search for and obtain information associated with a bottle of wine.
Figure 4B:
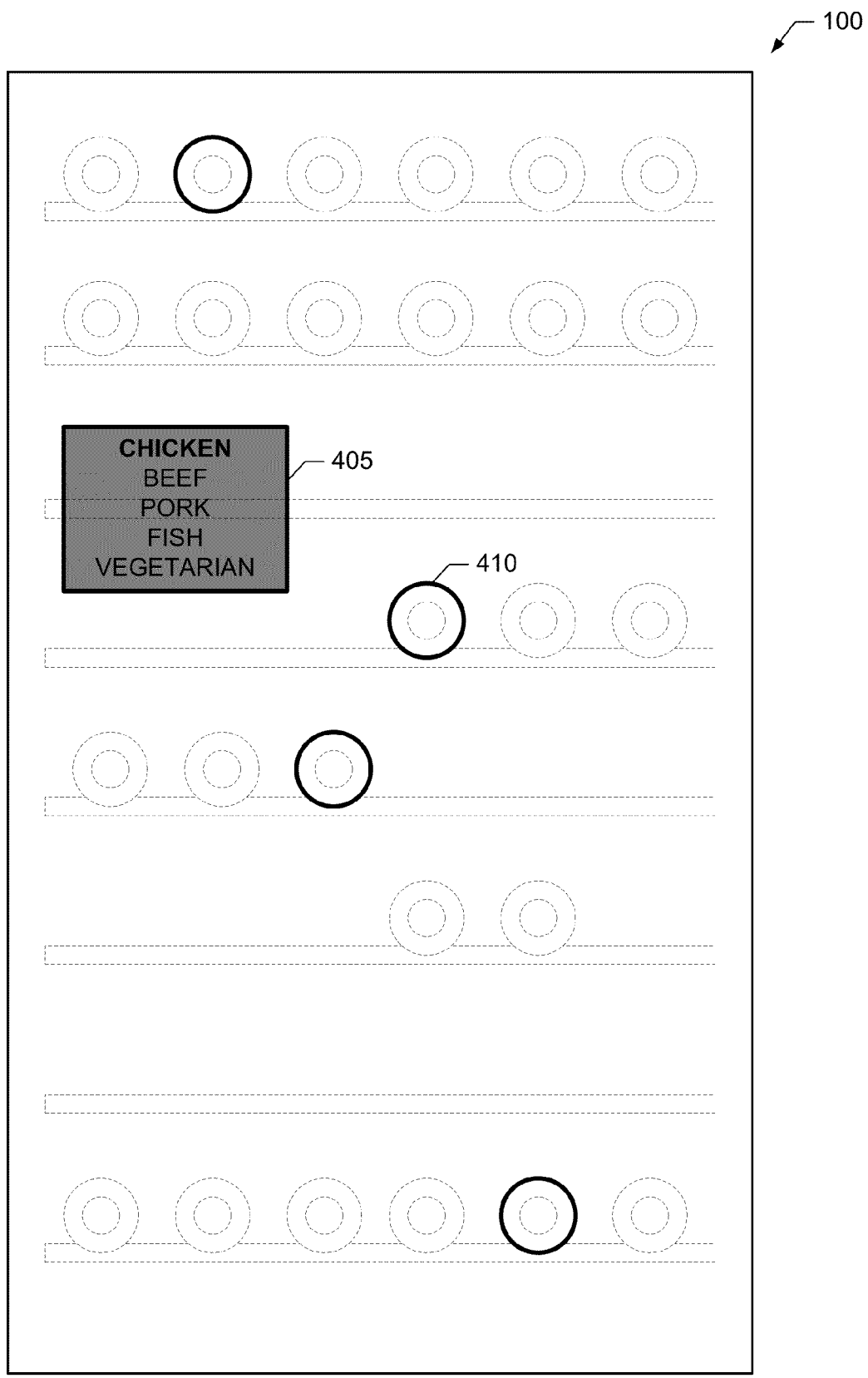

In FIG. 4A, the controller 220 causes the touch display 215 to present a menu 405 that enables the user 106 to select the type of main course to be served (e.g., chicken, beef, pork, fish, vegetarian, etc.). If the user 106 selects "chicken" using the menu 405, the controller 220 causes the touch display 215 to update the menu 405 to indicate that chicken was selected (see, FIG. 4B). As shown in FIG. 4B, the controller 220 causes the touch display 215 to display circles 410 having locations physically corresponding to bottles of wine stored in the wine cabinet 100 suitable for serving with chicken. While circles are used in the examples described herein, indicators having other geometries and/or characteristics may be used. The user 106 can select one of the identified wines by touching on or near the portion of the touch display 215 corresponding to the selected wine.

Figure 4C:
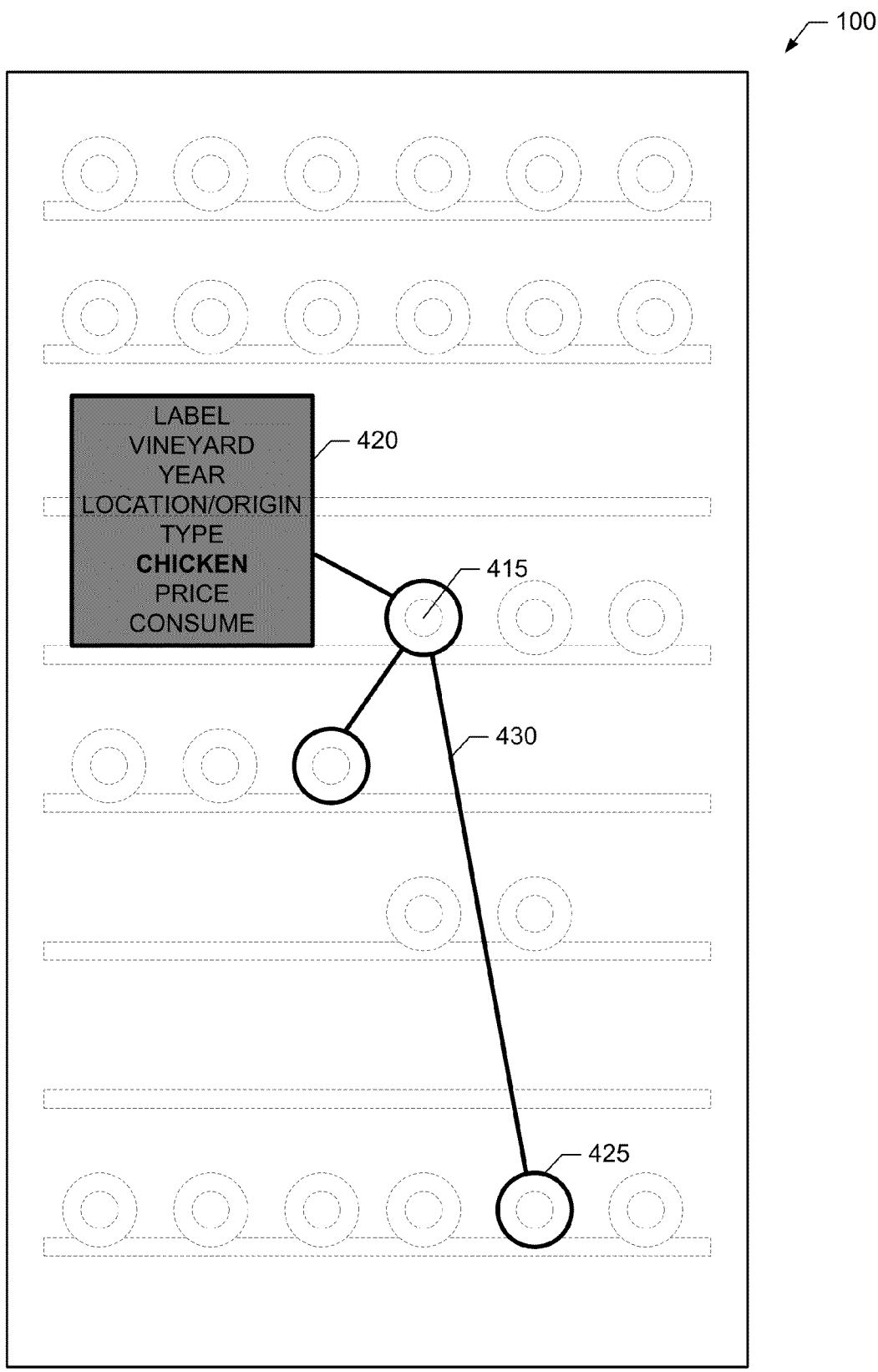

For example, as shown in FIG. 4C, if the user selects a bottle of wine 415, the controller 220 causes the touch display 215 to present information 420 associated with the bottle of wine 415 on the touch display 215. As shown in FIG. 4C, other wines that are similar to the selected bottle of wine 415 may be identified with circles 425 connected to the wine 415 with lines 430. Such similarity information can be used by the user 106 to make an alternative wine selection.

Figure 4D:
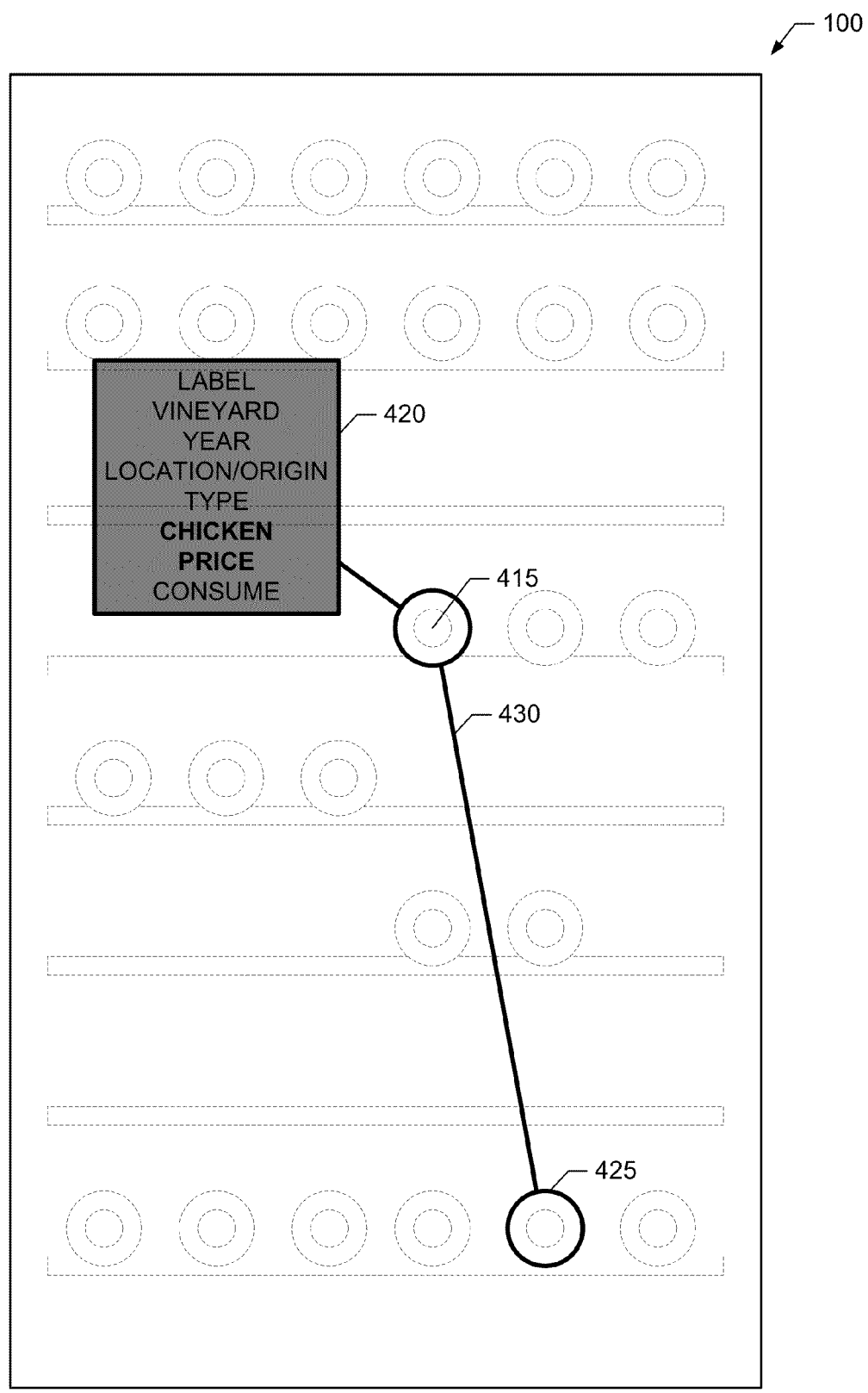

As shown in FIG. 4D, the user 106 may refine the displayed similarity information by selecting for example, "price," which restricts the circles 425 to only include those wines having prices similar to the selected wine 415.

Figure 4E:
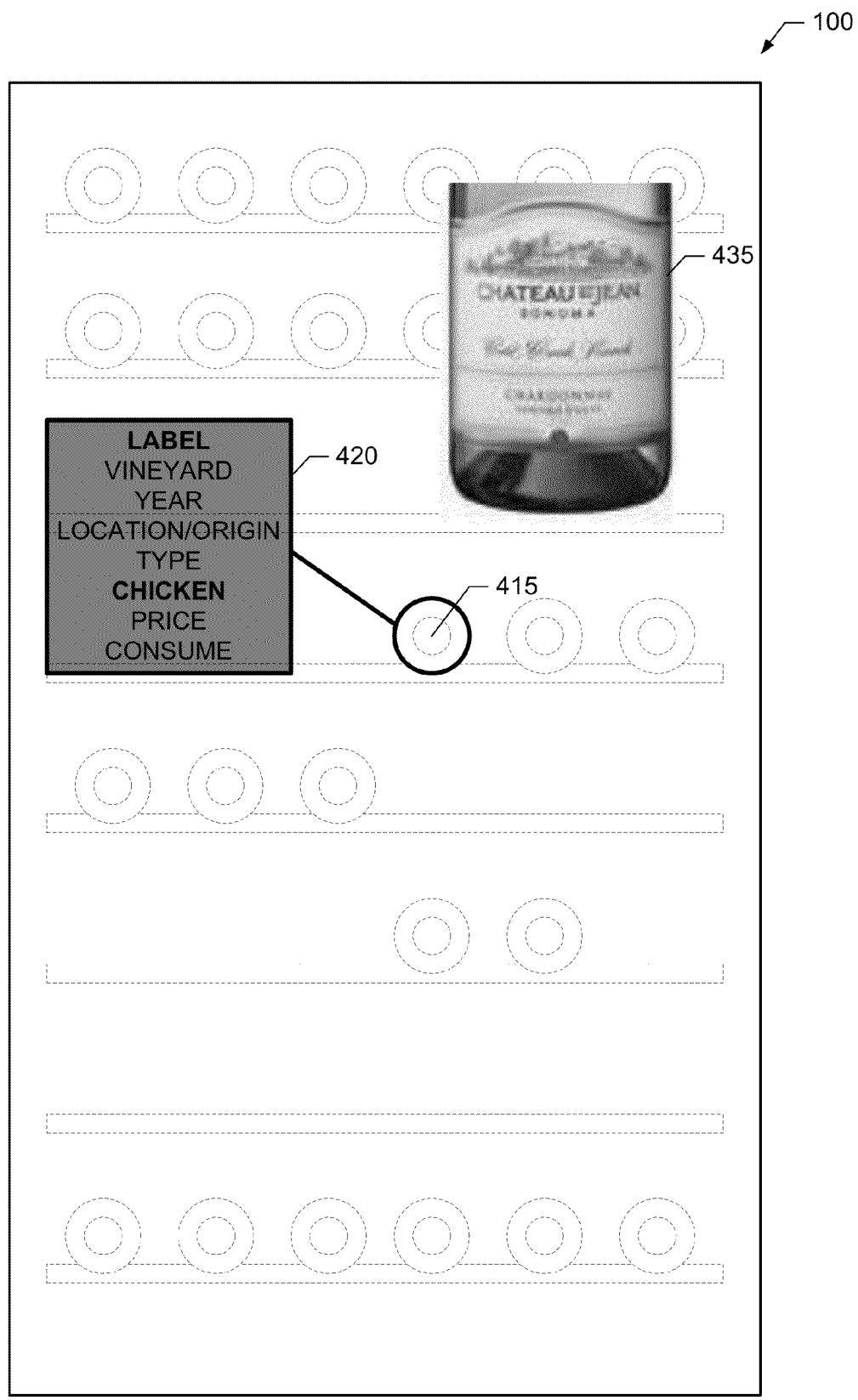

Returning to FIG. 4C, if the user selects "Label" in the information 420, the controller 220 causes the touch display 215 to display an image 435 of the label of the selected bottle 415, as shown in FIG. 4E. In some examples, the user can use a touch gesture to rotate the label 435 to mimic a virtual turning of the bottle of wine 415 without having to disturb or remove the bottle of wine 415 from the wine cabinet 435.

Returning to FIG. 4C, if the user selects "Consume" in the information 420, the controller 220 updates the wine database 225 to reflect that the bottle of wine 415 has or is to be consumed and will no longer be stored in wine cabinet 100.

FIGS. 5A-5E are a pictorial representation of an example usage of the example interactive transparent touch screen door 105 to search for and obtain information associated with a bottle of wine. The example usage of FIGS. 5A-5E may be activated when, for example, the user 106 touches the portion of the example menu 305 of FIG. 3 corresponding to the phrase "Search Wine."

Figure 5A:
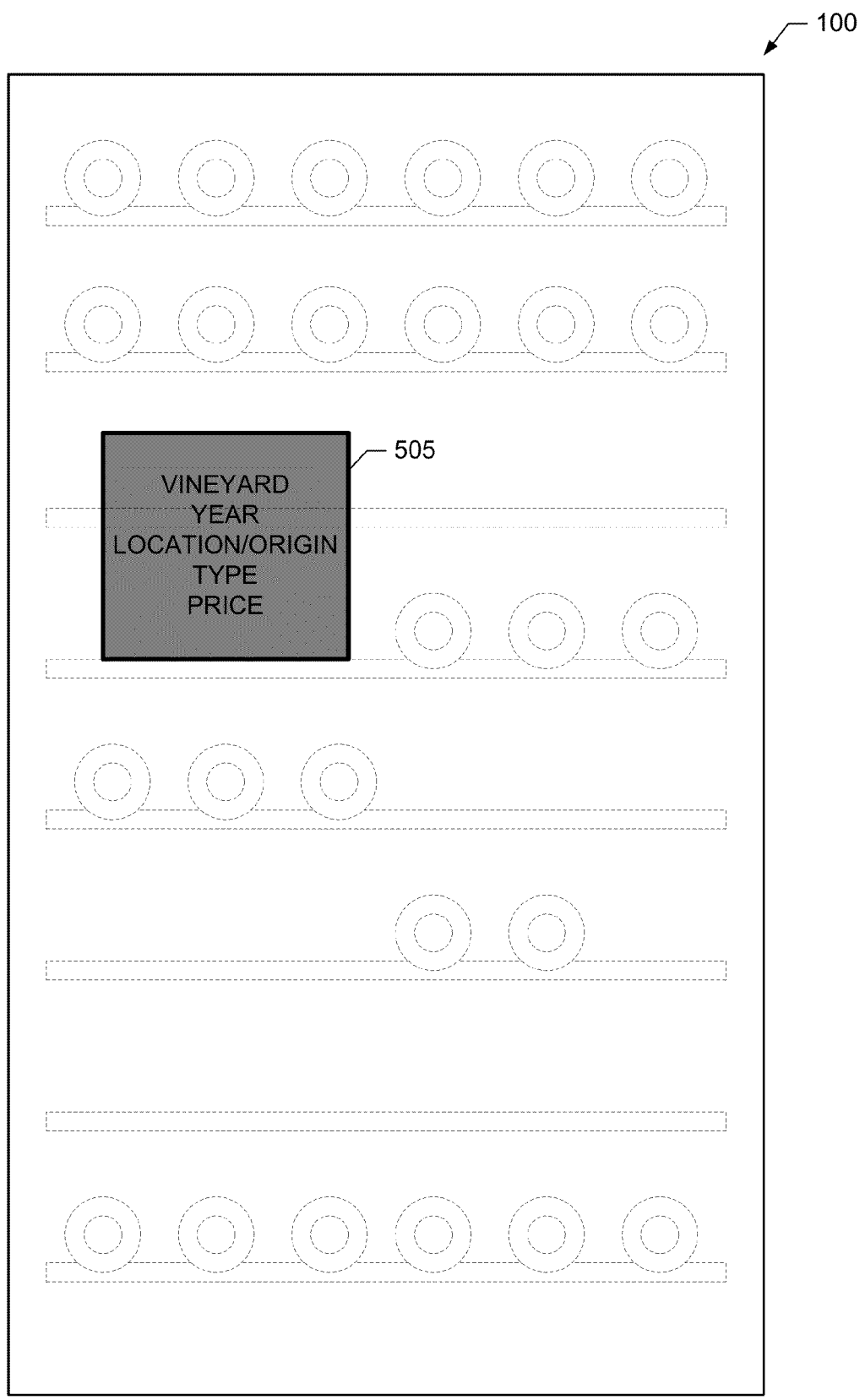
FIGS. 5A-5E are pictorial representations of another example usage of the example interactive transparent touch screen door of FIGS. 1 and 2 to search for and obtain information associated with a bottle of wine.
Figure 5B:
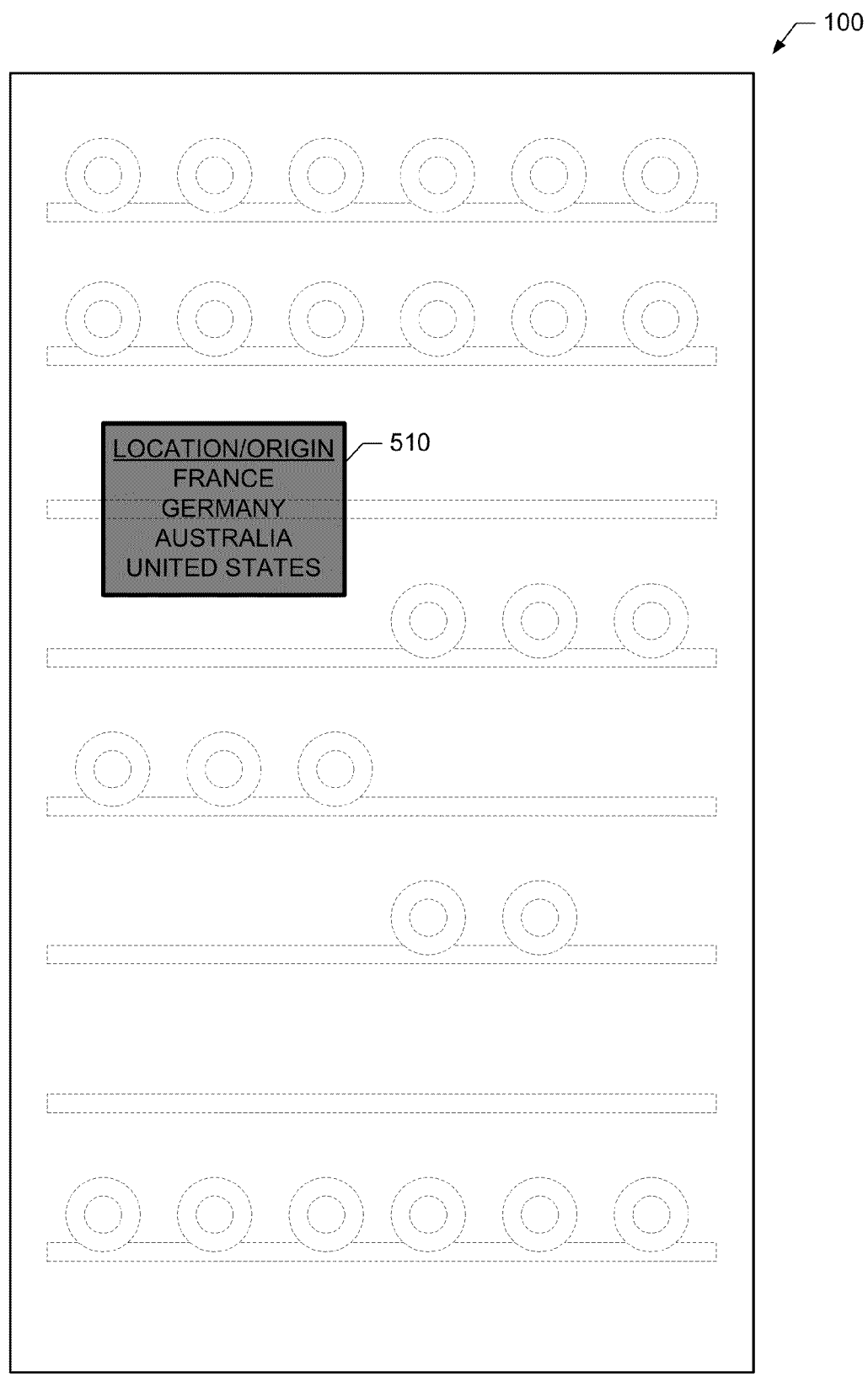
Figure 5C:
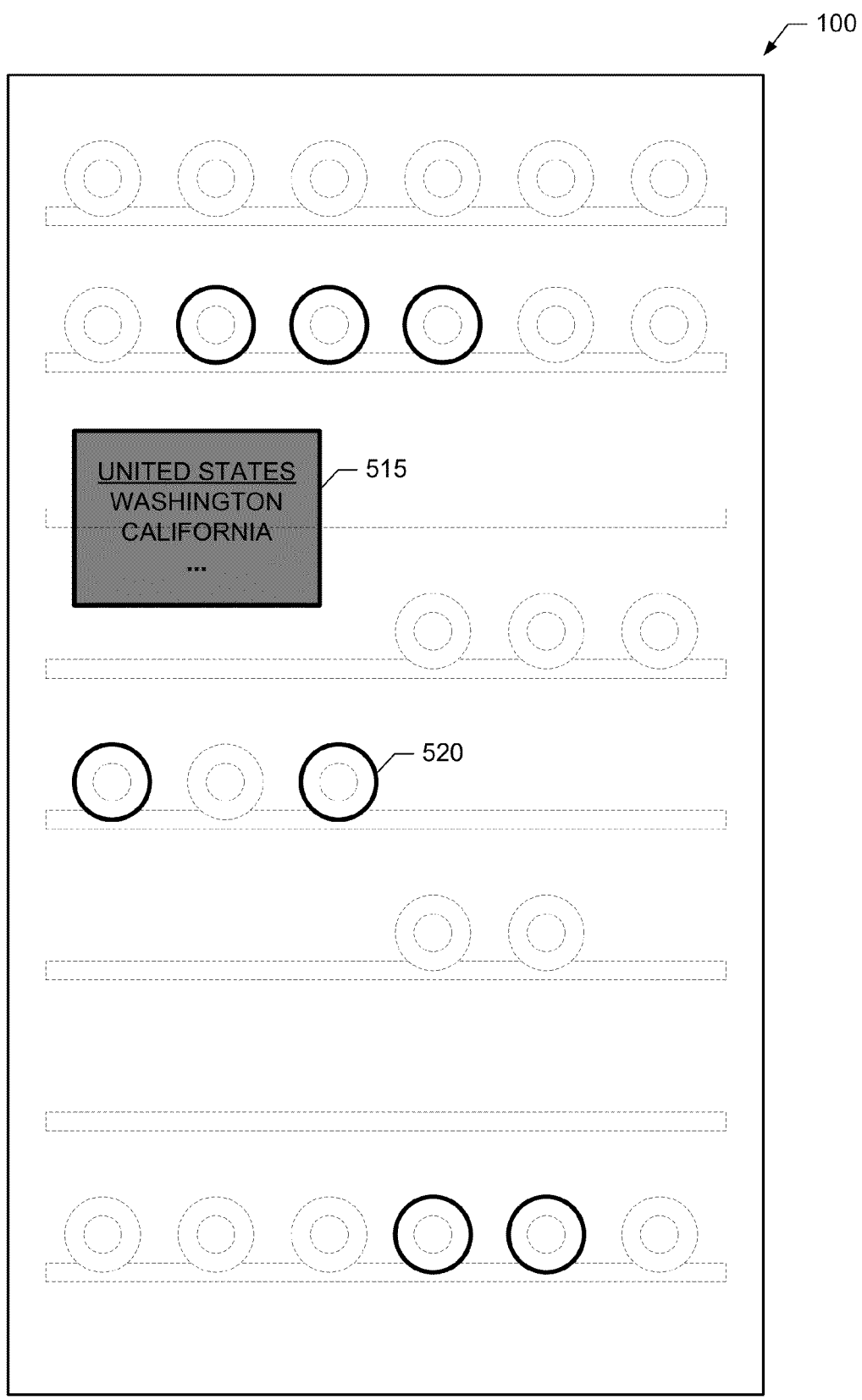

In FIG. 5A, the controller 220 causes the touch display 215 to present a menu 505 that enables the user 106 to select a search criteria. If the user 106 selects "Location/Origin" using the menu 505, the controller 220 causes the touch display 215 to present a menu 510 that enables the user 106 to select a location/origin, as shown in FIG. 5B. If the user 106 selects "United States" in the menu 510, the controller 220 causes the touch display 215 to present a menu 515 that enables the user 106 to select a location within the United States, as shown in FIG. 5C. The controller 220 may also cause the touch display 215 to display circles 520 having locations physically corresponding to bottles of wine stored in the wine cabinet 100 orginating in the United States.

Figure 5D:
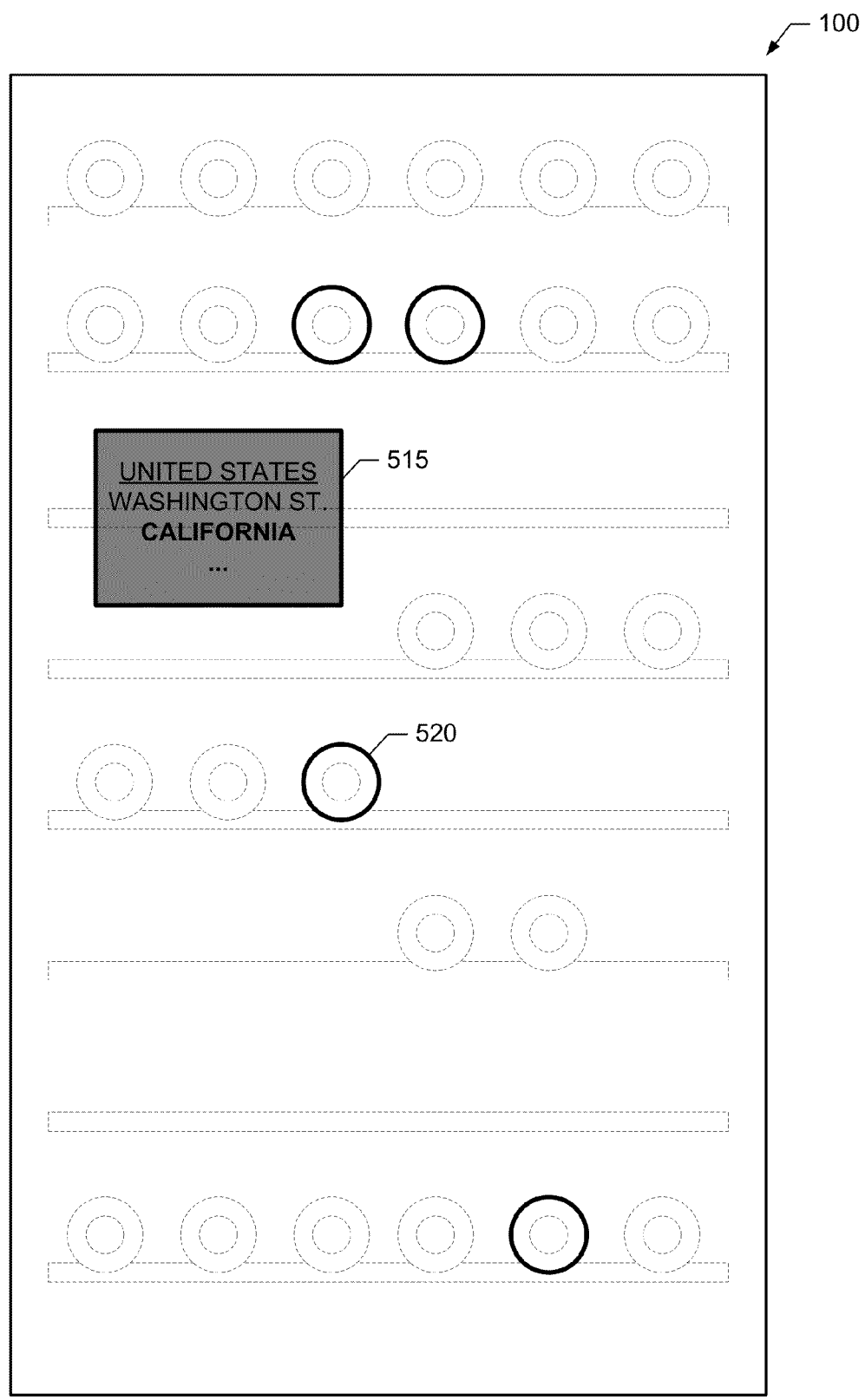

As shown in FIG. 5D, if the user 106 selects "California" in the menu 515, the controller 220 causes the touch display 215 to update the menu 515 to reflect that California has been selected and updates the circles 520 to only indicate wines that originated in California.

Figure 5E:
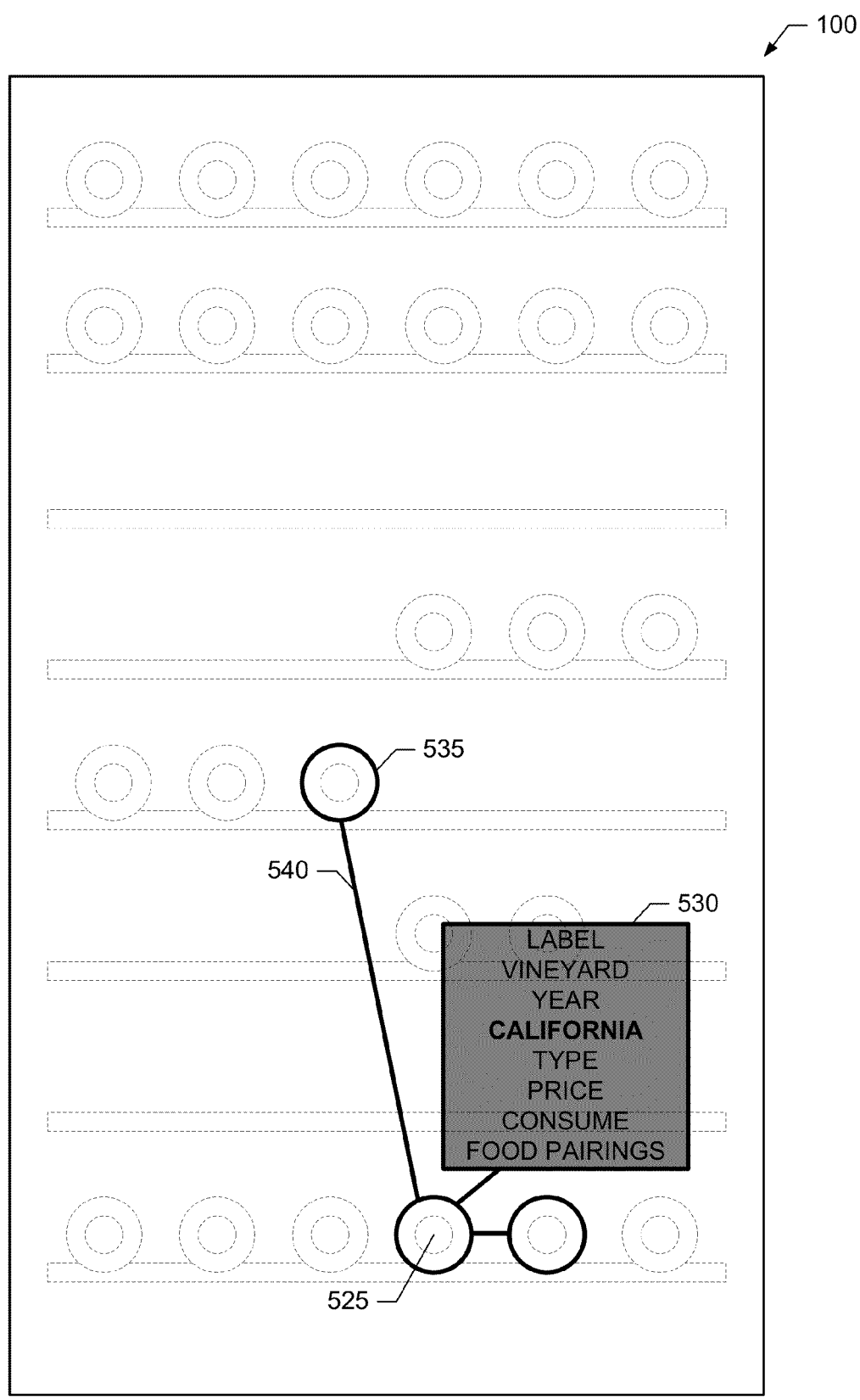

If the user selects a particular bottle of wine 525, as shown in FIG. 5E, the controller 220 causes the touch display 215 to present information 530 associated with the bottle of wine 525 on the touch display 215. As shown in FIG. 5E, other wines that are similar to the selected bottle of wine 525 may be identified with circles 535 connected to the bottle of wine 525 by lines 540. Such similarity information can be used by the user 106 to make an alternative wine selection.

Returning to FIG. 5A, in a similar fashion other search criteria such as year, vineyard, type, price, etc. may be used to search for and obtain information about a bottle of wine.

Figure 6A:
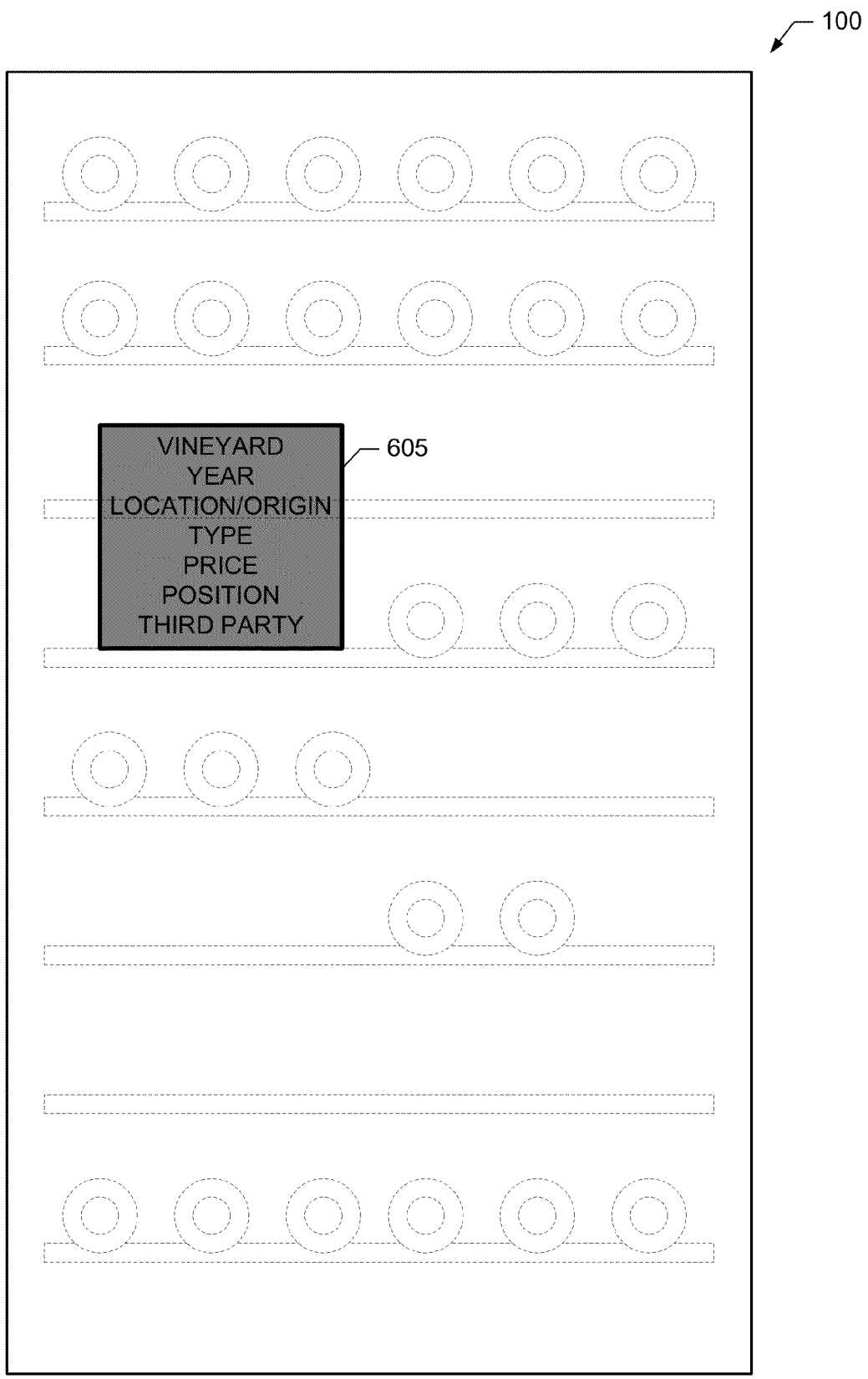
FIGS. 6A-6C are pictorial representations of an example usage of the example interactive transparent touch screen door of FIGS. 1 and 2 to add a bottle of wine to a wine cabinet.
Figure 6B:
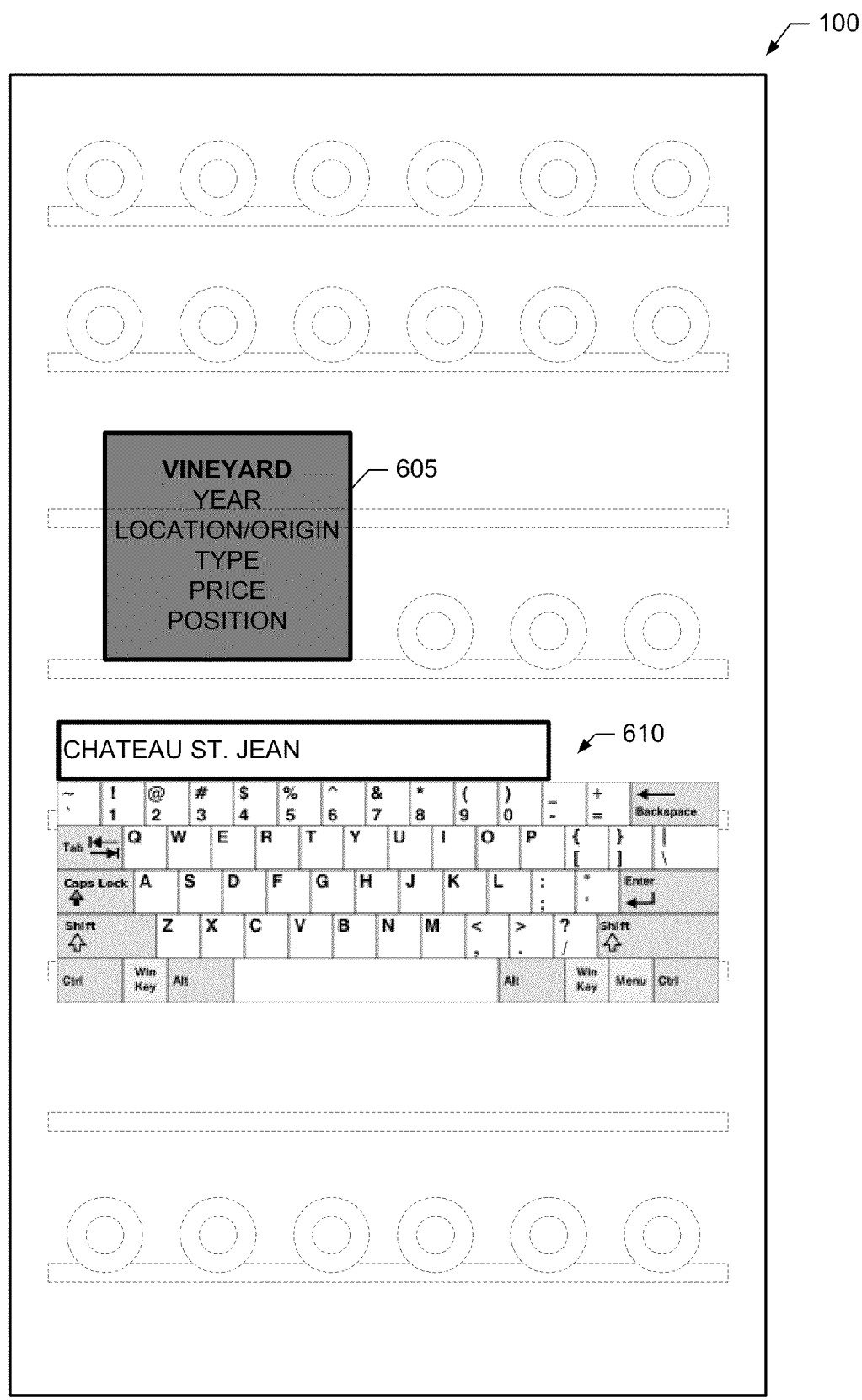
Figure 6C:
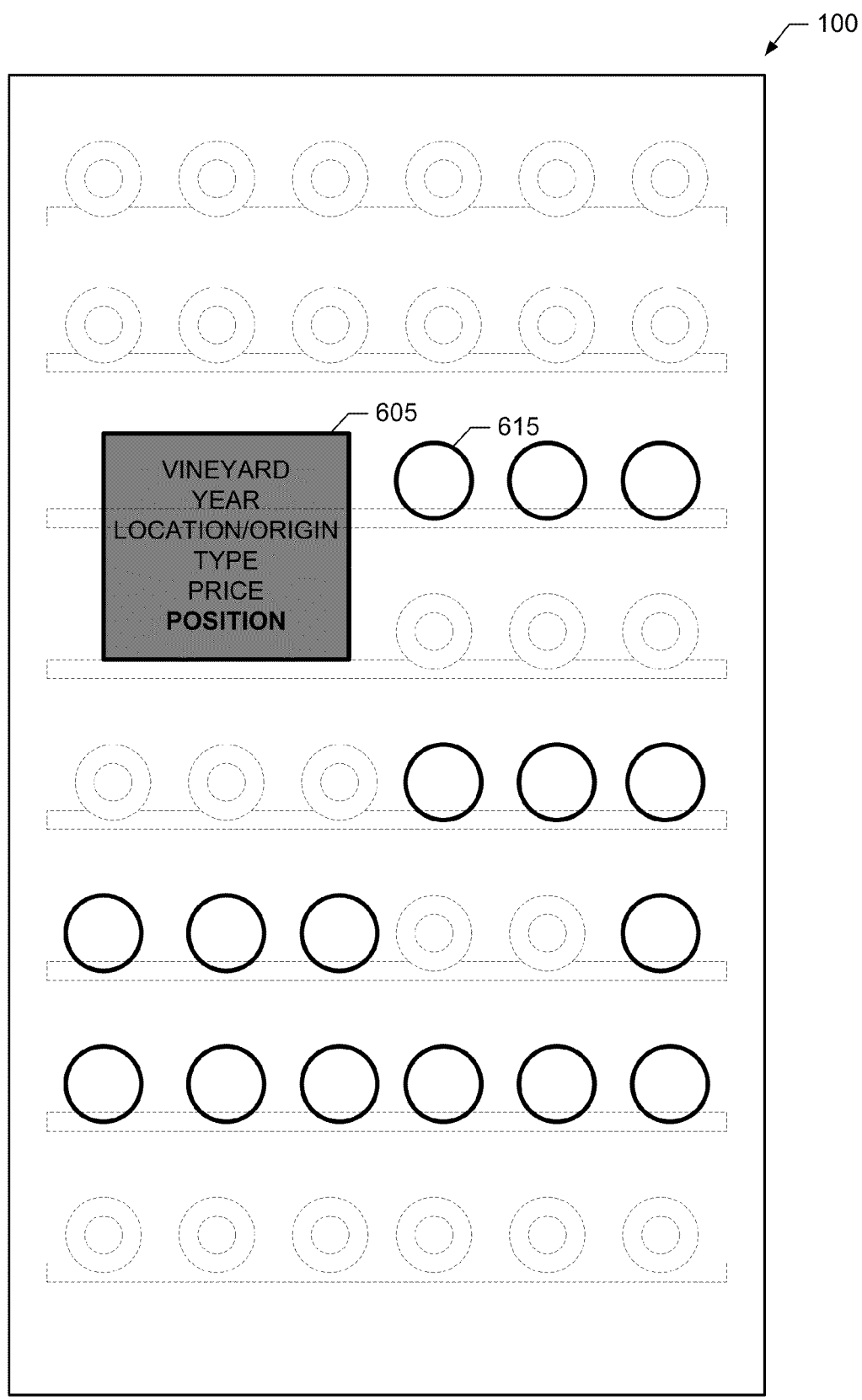

FIGS. 6A-6C are a pictorial representation of an example usage of the example interactive transparent touch screen door 105 to add a bottle of wine to the wine cabinet 100. The example usage of FIGS. 6A-6C may be activated when, for example, the user 106 touches the portion of the example menu 305 of FIG. 3 corresponding to the phrase "Add Wine."

In FIG. 6A, the controller 220 causes the touch display 215 to present a menu 605 that enables the user 106 to enter information associated with a new bottle of wine. The user 106 provides information by selecting one of the menu items presented in the menu 605 and uses one or more subsequent menus to provide the information. For example, as shown in FIG. 6B, if the user 106 selects to provide Vineyard information, a virtual keyboard 610 may appear that allows the user 106 to type in the name of the vineyard associated with the new bottle of wine. In some examples, the menu 605 includes an interface to third party wine databases to obtain information associated with the new bottle of wine.

To indicate a storage location in the wine cabinet 105 for the new bottle of wine, the user 106 selects the "position" item in the menu 605 of FIG. 6A. As shown in FIG. 6C, the controller 220 causes the touch display 215 to display circles 615 at each location of the wine cabinet not currently storing a bottle of wine. The user 106 may select the location for the new bottle of wine by touching in, on or near the corresponding circle 615.

Figure 7:
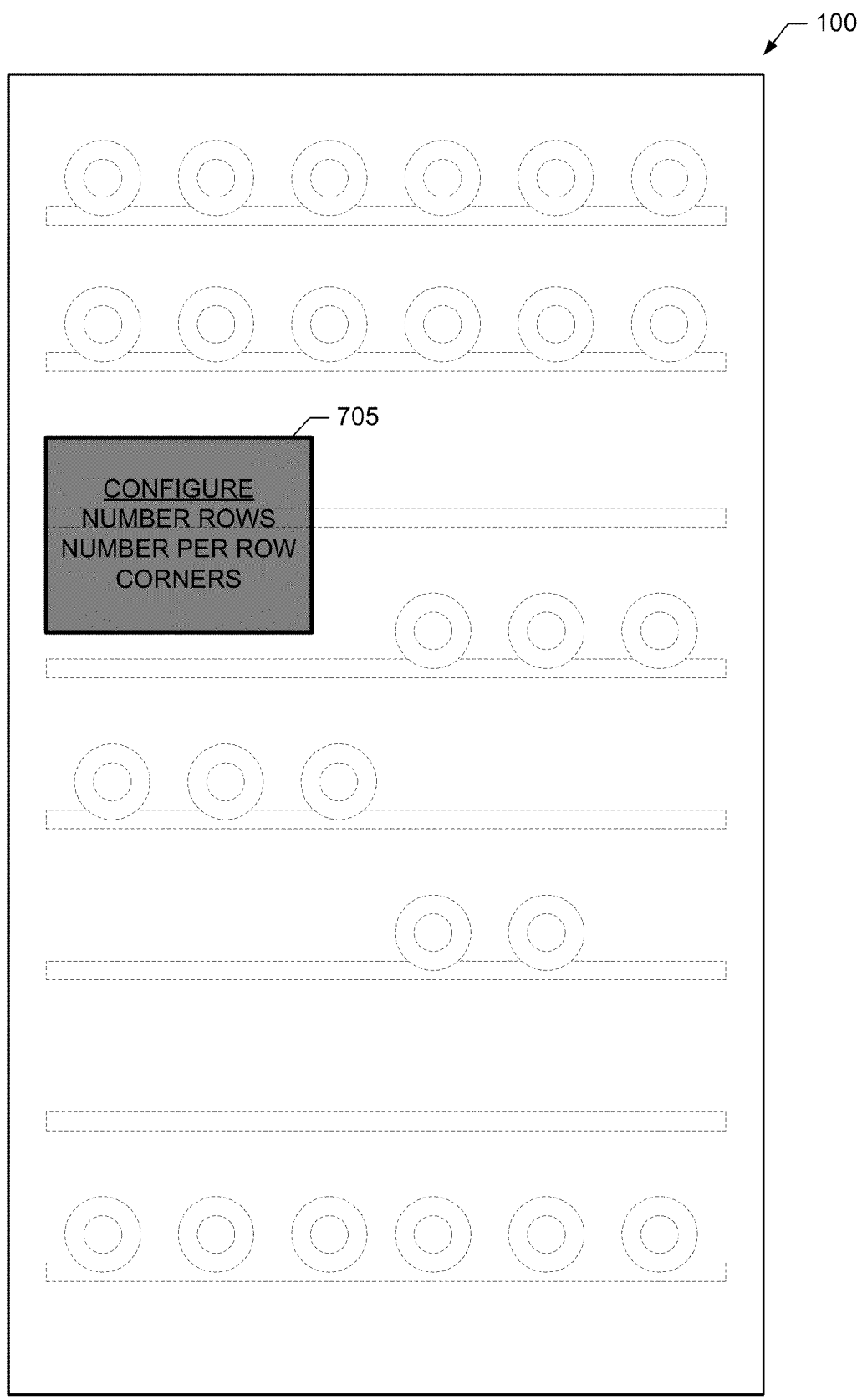
FIG. 7 is a pictorial representation of an example usage of the example interactive transparent touch screen door of FIGS. 1 and 2 to configure the interactive transparent touch screen door for use with a wine cabinet.

In some examples, the controller 220, the communication interface 230 and the wine database 225 are embedded in the door 105 to enable the door to be configurable for use with different wine cabinets. In such examples, the menu 305 of FIG. 3 may include an option that allows the user 106 to configure the possible locations of wine bottles in the wine cabinet 100. As shown in FIG. 7, the controller 220 may cause the touch display 215 to present a menu 705 that allows the user to identify the extent of the area used to store bottles of wine, the number of rows of wine, the number of bottles per row, etc.

Figure 8:
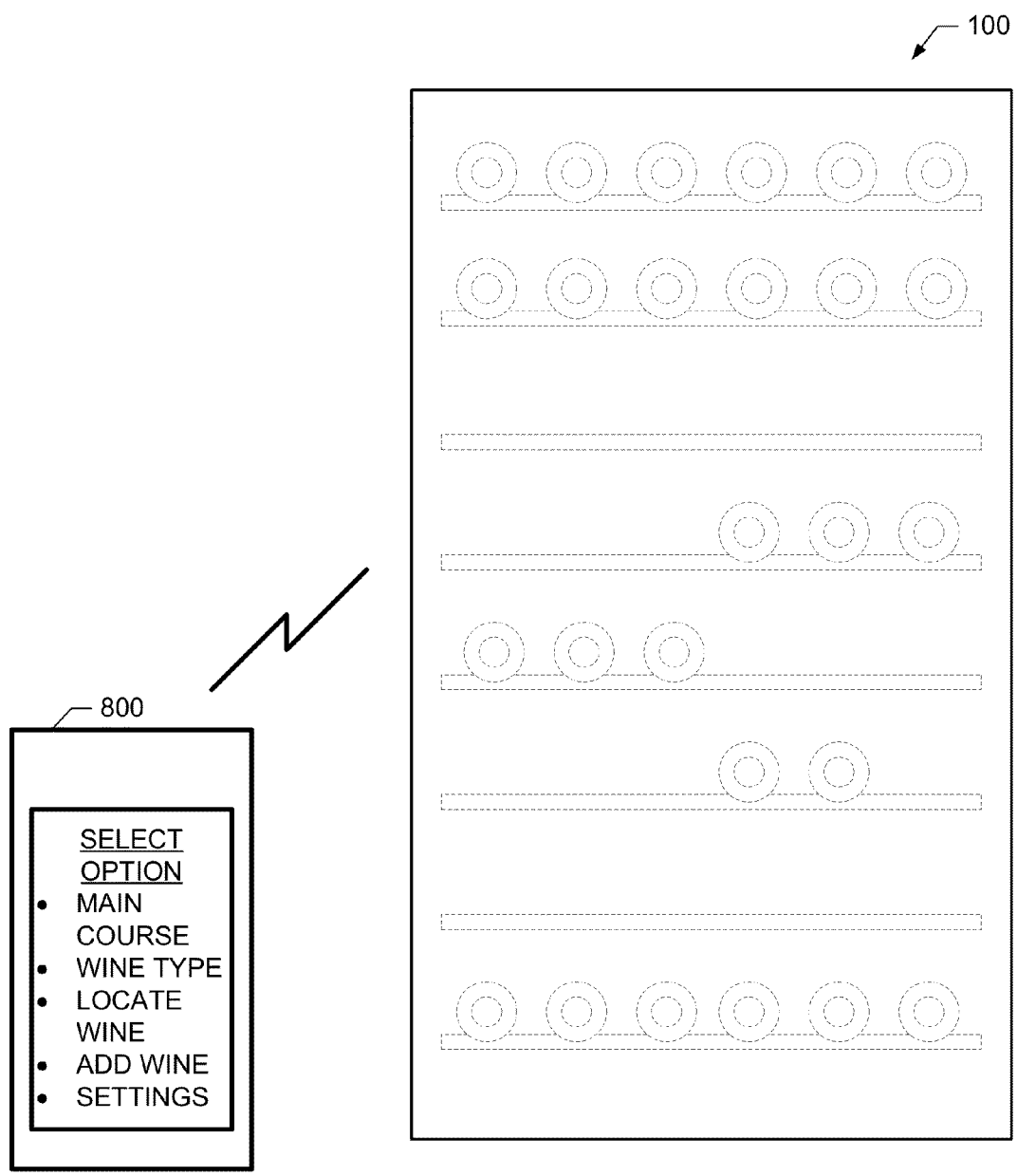
FIGS. 8, 9 and 10 are pictorial representations of an example usage of a handheld computing device to interact with the example interactive transparent touch screen door of FIGS. 1 and 2.
Figure 9:
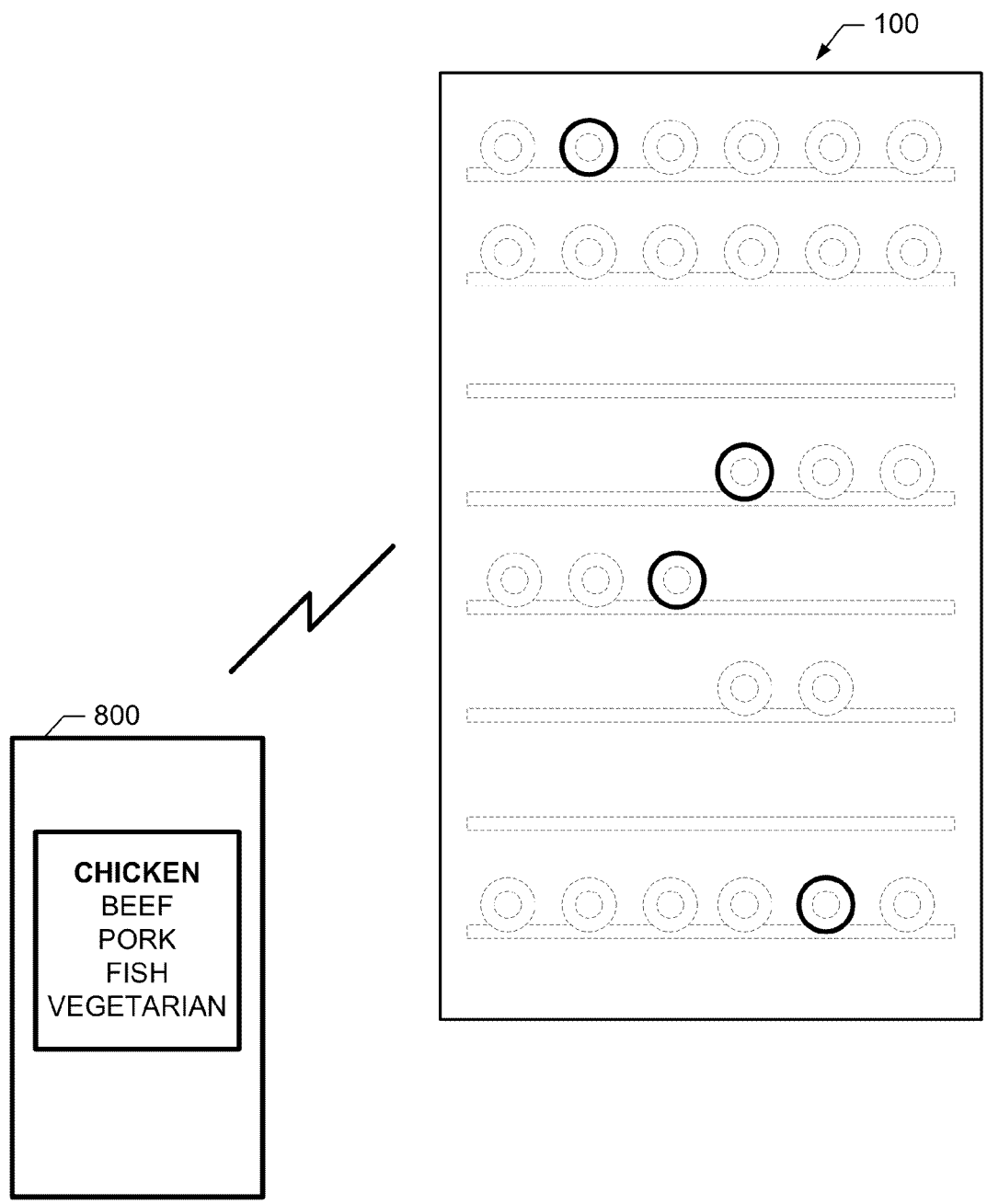
Figure 10:
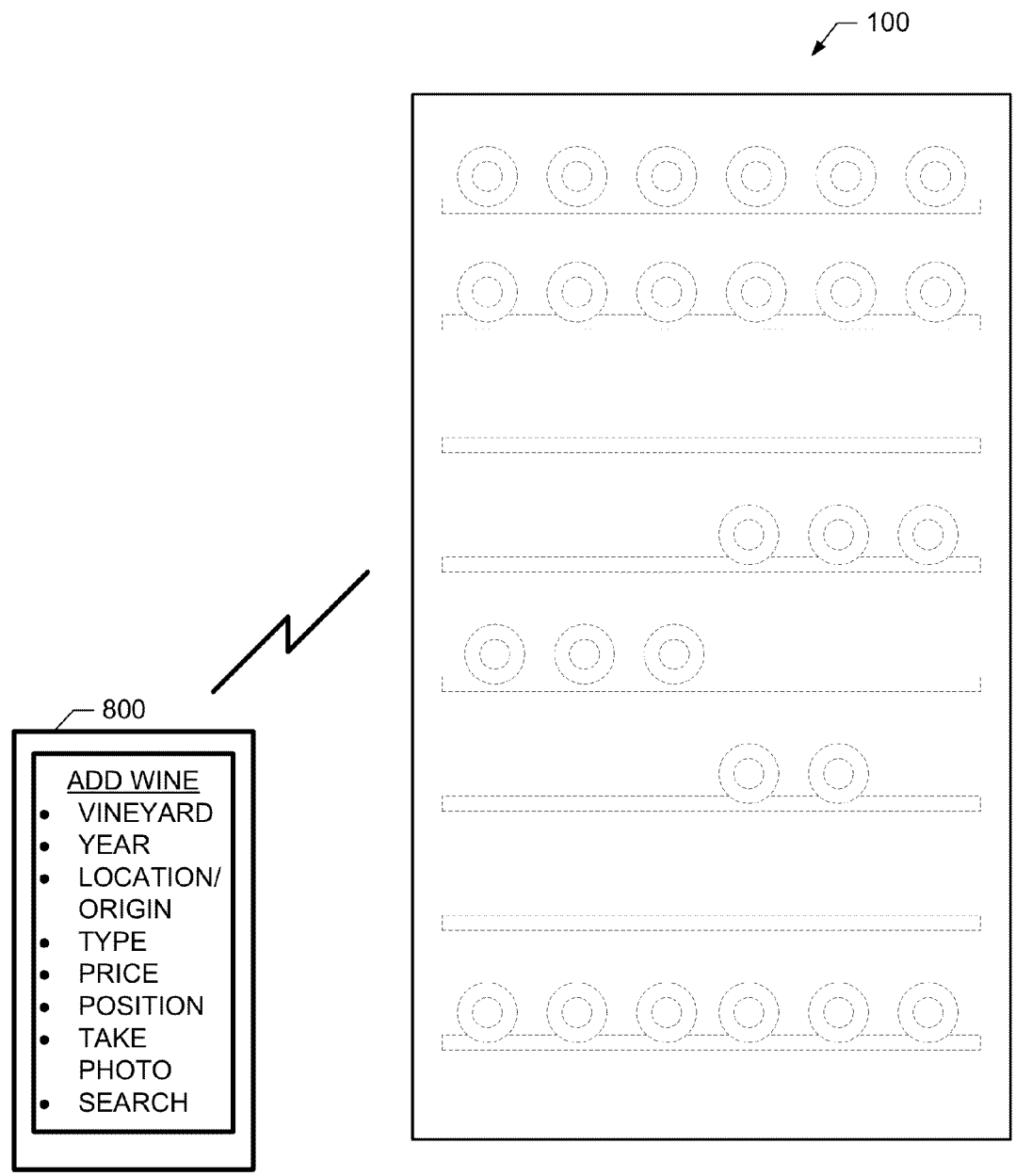

As shown in FIGS. 8-10, a handheld computing device 800 such as a smartphone, a tablet computer, etc. can be communicatively coupled to the wine cabinet 100 such that the user may interact with menus on the handheld computing device 800 rather than on the touch display 215. However, in such examples, indications regarding the physical locations of wines meeting search criteria may still be displayed on the touch display 215 (see FIG. 9), and information associated with a wine may still be displayed on the touch display 215. In addition to implementing menus, the handheld device 800 may be used to capture one or more images of a new bottle of wine before the bottle of wine is stored in the wine cabinet 100 (see FIG. 10) and/or may store the wine database 225. In some examples, the handheld computing device 800 may perform image processing and/or image recognition on an image of a bottle label to automatically identify a bottle of wine and to obtain information regarding a bottle of wine from a third party wine database. Moreover, the handheld computing device 800 may scan and use information stored in a one, two or three-dimensional universal product code (UPC) label printed on the bottle of wine to identify and/or obtain information regarding the bottle of wine.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An interactive touch screen door for use with a wine cabinet having a refrigerated compartment and a rack in the refrigerated compartment to hold bottles of wine, the touch screen door to provide access to the refrigerated compartment and comprising:

a transparent touch display embedded in the door and having a size at least corresponding to a portion of the refrigerated compartment intended to store wine; and a controller operatively connected to the transparent touch display and configured to:

provide on the transparent touch display information associated with wine stored in the cabinet;

receive via the transparent touch display a wine search parameter; and display on the transparent touch display one or more indicators at the physical locations of one or more bottles of wine in the cabinet corresponding to the wine search parameter, wherein the one or more indicators are superimposed on the transparent touch display to be in line with at least a portion of a contour of at least one of the one or more bottles of wine corresponding to the wine search parameter.

2. An interactive touch screen door as defined in claim 1, wherein the wine search parameter comprises at least one of a food type, a price, a year, a location/origin, a vineyard, or a wine type.

3. An interactive touch screen door as defined in claim 1, wherein the controller is configured to:

receive via the transparent touch display a wine selection; and display on the transparent touch display information associated with a bottle of wine corresponding to the wine selection.

4. An interactive touch screen door as defined in claim 3, wherein the information associated with the bottle of wine comprises an image of a label on the bottle of wine.

5. An interactive touch screen door as defined in claim 3, wherein the information associated with the bottle of wine comprises at least one of a suggested food pairing, a price, a year, a location/origin, a vineyard, or a wine type.

6. An interactive touch screen door as defined in claim 1, wherein the controller is configured to:

receive via the transparent touch display a wine consumption indication; and update a wine database to represent that a bottle of wine corresponding to the wine consumption indication is no longer stored in the wine cabinet.

7. An interactive touch screen door as defined in claim 1, wherein the controller is configured to:

receive via the transparent touch display an add wine bottle indication;

display on the transparent touch display one or more menus that enable a user to provide information to be associated with a bottle of wine to be stored in the wine cabinet;

receive via the transparent touch display an indication of a location where the bottle of wine is to be stored in the wine cabinet; and store the information and the location in a wine database.

8. An interactive touch screen door as defined in claim 1, wherein the controller is configured to present on the transparent touch display one or more menus that enable a user to configure potential locations of bottles of wine in the wine cabinet.

9. An interactive touch screen door as defined in claim 1, wherein the door is configurable for use with different wine cabinets.

10. An interactive touch screen door as defined in claim 1, further comprising a handheld computing device communicatively coupled to the controller, the handheld computing device configured to:

receive a wine search parameter; and direct the controller to display on the transparent touch display one or more indicators corresponding to physical locations of one or more bottles of wine in the cabinet corresponding to the wine search parameter.

11. An interactive touch screen door as defined in claim 10, wherein the controller is configured to receive via the transparent touch display a wine selection, and the handheld computing device is configured to display information associated with a bottle of wine corresponding to the wine selection.

12. An interactive touch screen door as defined in claim 11, wherein the information is displayed on the transparent touch display.

13. An interactive touch screen door as defined in claim 1, further comprising a handheld computing device communicatively coupled to the controller, the handheld computing device configured to:
   receive an add wine bottle indicator; and
   receive via the transparent touch display an indication of where a bottle of wine is to be stored in the wine cabinet.

14. An interactive touch screen door as defined in claim 13, wherein the handheld computing device is configured to capture an image of a label of the bottle of wine.

15. An interactive touch screen door as defined in claim 14, wherein the handheld computing device is configured to perform image processing on the captured image to identify the bottle of wine and to automatically obtain information to be associated with the bottle of wine based on the determined identity.

16. An interactive touch screen door as defined in claim 13, wherein the handheld computing device is configured to display on the handheld computing device one or more menus that enable a user to provide information to be associated with the bottle of wine to be stored in the wine cabinet.

17. A method of controlling an interactive wine cabinet including a refrigerated compartment, a rack to hold bottles of wine in the refrigerated compartment, a door to provide access to the refrigerated compartment, and a transparent touch display embedded in the door having a size at least corresponding to a portion of the refrigerated compartment intended to store wine, the method comprising:
   receiving via the transparent touch display a wine search parameter; and
   displaying on the transparent touch display one or more indicators at the physical locations of one or more bottles of wine in the cabinet meeting the wine search parameter, wherein the one or more indicators are superimposed on the transparent touch display to be in line with at least a portion of a contour of at least one of the one or more bottles of wine corresponding to the wine search parameter.

18. A method as defined in claim 17, wherein the wine search parameter comprises at least one of a food type, a price, a year, a location/origin, a vineyard, or a wine type.

19. A method as defined in claim 17, further comprising:
   receiving via the transparent touch display a wine selection; and
   displaying on the transparent touch display information associated with a bottle of wine corresponding to the wine selection.

20. A method as defined in claim 19, wherein the information associated with the bottle of wine comprises an image of a label on the bottle of wine.

21. A method as defined in claim 17, further comprising:
   receiving via the transparent touch display a wine consumption indication; and
   updating a wine database to reflect that a bottle of wine corresponding to the wine consumption indication is no longer stored in the wine cabinet.

22. A method as defined in claim 17, further comprising:
   receiving via the transparent touch display an add wine bottle indicator;
   displaying one on the transparent touch display or more menus that enable a user to provide information to be associated with a bottle of wine to be stored in the wine cabinet;
   receiving via the transparent touch display an indication of a location where the bottle of wine is to be stored in the wine cabinet; and
   storing the information and the location in a wine database.

23. A method as defined in claim 17, further comprising presenting one or more menus on the transparent touch display that enable a user to configure potential locations of bottles of wine in the wine cabinet.

* * * * *